US008831657B2

United States Patent
Sun et al.

(10) Patent No.: US 8,831,657 B2
(45) Date of Patent: Sep. 9, 2014

(54) TRANSMISSION POWER CONFIGURATION METHOD AND APPARATUS FOR DEMODULATION REFERENCE SIGNAL

(75) Inventors: Yunfeng Sun, Shenzhen (CN); Wenfeng Zhang, Shenzhen (CN); Jing Jiang, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,310

(22) PCT Filed: Oct. 20, 2010

(86) PCT No.: PCT/CN2010/077913
§ 371 (c)(1),
(2), (4) Date: Jul. 12, 2012

(87) PCT Pub. No.: WO2011/097894
PCT Pub. Date: Aug. 18, 2011

(65) Prior Publication Data
US 2012/0270591 A1    Oct. 25, 2012

(30) Foreign Application Priority Data
Feb. 10, 2010    (CN) .......................... 2010 1 0116411

(51) Int. Cl.
*H04W 72/00*    (2009.01)
*H04B 7/00*     (2006.01)
*H04W 52/14*    (2009.01)
*H04W 52/42*    (2009.01)
*H04W 52/32*    (2009.01)
*H04L 5/00*     (2006.01)

(52) U.S. Cl.
CPC ............ *H04W 52/325* (2013.01); *H04W 52/42* (2013.01); *H04L 5/0048* (2013.01); *H04L 5/0035* (2013.01)
USPC ........ 455/509; 455/452.1; 455/450; 455/507; 455/522

(58) Field of Classification Search
CPC .................................................... H04L 5/0035
USPC .............. 455/522, 69, 127.1, 509, 452.1, 450
See application file for complete search history.

(56) References Cited

U.S. PATENT DOCUMENTS 8,059,611 B2 * 11/2011 Ishii et al. ...................... 370/334
8,064,392 B2 * 11/2011 Chang et al. ................... 370/329
(Continued)

FOREIGN PATENT DOCUMENTS

| CN | 101365232 A | 2/2009 |
| CN | 101384078 A | 3/2009 |

(Continued)

OTHER PUBLICATIONS

International Search Report in international application number: PCT/CN2010/077913, mailed on Jan. 27, 2011.

(Continued)

*Primary Examiner* — Tilahun B Gesesse
(74) *Attorney, Agent, or Firm* — Oppedahl Patent Law Firm LLC

(57) ABSTRACT

The present disclosure discloses a transmission power configuration method for a Demodulation Reference Signal (DMRS), and the method comprises: configuring the ratio between transmission power of a DMRS at each layer in a Resource Element (RE) and transmission power of data at a corresponding layer to be a constant value. Meanwhile, the present disclosure discloses a transmission power configuration apparatus for the DMRS. The present disclosure greatly improves the correct rate of data frame decoding, and improves decoding performance. The present disclosure enables the network side not need to notify a UE of the corresponding relationship between transmission power of DMRS at each layer and transmission power of data at the corresponding layer, which simplifies the overhead of the control signalling in the network side. As the corresponding relationship between transmission power of DMRS at each layer and transmission power of data at the corresponding layer is configured in the UE, the UE can implement channel estimation without waiting for the notification from the network side, which improves the channel estimation efficiency.

6 Claims, 2 Drawing Sheets

(56) References Cited

U.S. PATENT DOCUMENTS

| | | | |
|---|---|---|---|
| 8,472,539 B2* | 6/2013 | Ko et al. | 375/260 |
| 2009/0201863 A1 | 8/2009 | Pi | |
| 2010/0034077 A1* | 2/2010 | Ishii et al. | 370/210 |
| 2010/0254471 A1* | 10/2010 | Ko et al. | 375/260 |
| 2012/0134338 A1* | 5/2012 | Ko et al. | 370/330 |
| 2012/0163335 A1* | 6/2012 | Chung et al. | 370/330 |
| 2012/0207119 A1* | 8/2012 | Zhang et al. | 370/329 |
| 2012/0270591 A1* | 10/2012 | Sun et al. | 455/522 |
| 2012/0281555 A1* | 11/2012 | Gao et al. | 370/252 |
| 2013/0188577 A1* | 7/2013 | Papasakellariou et al. | 370/329 |
| 2013/0287064 A1* | 10/2013 | Seo et al. | 375/144 |

FOREIGN PATENT DOCUMENTS

| | | |
|---|---|---|
| CN | 101621492 A | 1/2010 |
| EP | 2088709 A2 | 8/2009 |
| RU | 2364043 C2 | 8/2009 |

OTHER PUBLICATIONS

English Translation of the Written Opinion of the International Search Authority in international application number: PCT/CN2010/077913, mailed on Jan. 27, 2011.

Downlink control signalling for transparent MU-MIMO Jan. 18, 2010.

Consideration on Downlink Signalling for MU-MIMO Jan. 18, 2010.

Joint consideration of DL DM-RS design and codeword-layer mapping for rank over 3 Oct. 12, 2009.

NEC Group: "Downlink control signalling support for SU/MU-MIMO", 3GPP Draft; R1-094730-MU-MIMO_Signaling, 3rd Generation Partnership Project (3GPP), Mobile Competence Centre; 650, Route des Lucioles; F-06921 Sophia-Antipolis Cedex; France, no. Jeju; Nov. 9, 2009.

Supplementary European Search Report in European application No. 10845564.3, mailed on Jul. 22, 2014.

* cited by examiner

TRANSMISSION POWER CONFIGURATION METHOD AND APPARATUS FOR DEMODULATION REFERENCE SIGNAL

TECHNICAL FIELD

The present disclosure relates to a design technique of power offset of Resource Element (RE) corresponding to Demodulation Reference Signal (DMRS) relative to data resource element, in particular to a transmission power configuration method and apparatus for a demodulation reference signal.

BACKGROUND

Advanced multi-antenna technology is one of the key technologies of Long Term Evolution Advanced (LTE-A or LTE-Advanced) system, and is used for improving the system transmission speed. In order to realize the channel quality measurement and data demodulation after the advanced multi-antenna technology is introduced, the LTE-A system is defined into two types of pilot signals: DMRS and Channel State Information-Reference Signal (CSI-RS), wherein the DMRS is used for the demodulation reference signal of Physical Downlink Shared Channel (PDSCH), and the measured reference signal CSI-RS of Channel State Information (CSI) is used for the information reporting of Channel Quality Indicator (CQI), Precoding Matrix Indicator (PMI), Rank Indicator (RI) and the like. The structures of the two types of reference signals can be used for supporting new technology of LTE-A system such as Coordinated Multi-Point (CoMP) and spatial multiplexing.

In the LTE system, the pilot frequency is measured by adopting Common Reference Signal (CRS), that is, all users use public pilot frequency to perform channel estimation; the CRS needs a transmitting side extra notification message to notify the receiving side which pre-treatment process is adopted for transmitted data, and the extra notification message brings about extra overhead. Moreover, in MU-MIMO, a plurality of CRSs used by the UE are the same, which cannot realize the orthogonality of the pilot frequency. Therefore, the interference cannot be estimated.

In the LTE-A system, in order to reduce the overhead of pilot frequency, CSI-RS and DMRS are separately designed, wherein DMRS and data adopt the same pre-treatment process; meanwhile, DMRS is particularly mapped according to available rank information of the channel for scheduling user. Therefore, the overhead can be adjusted in a self-adaptive manner according to the rank information so that the overhead can be greatly reduced in the condition of relatively smaller rank.

FIG. 1 shows a diagram of DMRS bearing in normal sub-frame and specific sub-frame under normal Cyclic Prefix (CP) in the LTE_A system. As shown in FIG. 1, the design pattern of the DMRS has already been determined in the current discussion, wherein only the RE corresponding to the sand point grid shown in the diagram is used for bearing the DMRS when the rank number used in the downlink transmission is less than or equal to 2, and Orthogonal Cover Code (OCC) with a length of 2 is adopted for scrambling two adjacent Orthogonal Frequency Division Multiplexing (OFDM) symbols in time domain. Two sets of RE are used for bearing the DMRS when the rank number is greater than or equal to 3 and less than or equal to 4, and the two sets of RE are respectively corresponding to the sand point grid and the graticule line grid in the diagram, wherein the DMRS layer number of the maximum orthogonal Code Division Multiplexing (CDM) in each set of RE is 2, and the orthogonal cover code with a length of 2 is adopted for performing orthogonal scrambling on the two adjacent OFDM signals in time domain simultaneously in each set. While the OCC code with a length of 4 is adopted for performing orthogonal scrambling in time domain direction in each set of the two sets of RE for bearing the DMRS when the rank number is greater than 4, and the DMRS layer number of the maximum orthogonal CDM in each set of RE is 4. In FIG. 1, the left diagram is a diagram of the DMRS bearing in a normal sub-frame, and the middle diagram and the right diagram are diagrams of the DMRS bearing in a specific sub-frame.

According to the DMRS mapping shown in FIG. 1, a mixed multiplexing of Frequency Division Multiplexing (FDM) and CDM is introduced. Therefore, transmitting powers corresponding to different layers of the resource element for bearing the DMRS can be different when the total layer number is odd, and the transmitting power with total layer number is 2 is different from that with total layer number is even but excluding 2.

SUMMARY

In view of this, the main purpose of the present disclosure is to provide a transmission power configuration method and apparatus for a demodulation reference signal, which are capable of implementing channel estimation without waiting for the notification from the network side.

In order to achieve the above purpose, the technical solution of the present disclosure is realized by:

a transmission power configuration method for a demodulation reference signal, and the method includes:

the ratio between the transmission power of the DMRS at each layer in a DMRS RE and the transmission power of the data at a corresponding layer in a data RE is configured to be a constant value.

Preferably, the method may further include: the transmission power of the DMRS at each layer in the same RE is configured to the same.

Preferably, the method may further include: different constant values for different total layer numbers used in downlink transmission are set; or an unique constant value for different total layer numbers used in the downlink transmission is set.

Preferably, the step of setting the different constant values for different total layer numbers used in the downlink transmission may specifically include: a first constant value is set when the total layer number used in the downlink transmission is less than or equal to 2; and a second constant value is set when the total layer number used in the downlink transmission is greater than or equal to 3.

Preferably, the method may further include: mapping the DMRS at one layer onto two DMRS ports when a total layer number used in downlink transmission is greater than or equal to 3 and is odd.

A transmission power configuration apparatus for DMRS, and the apparatus includes:

a configuration unit for configuring the ratio between transmission power of a DMRS at each layer in a DMRS RE and transmission power of data at a corresponding layer in a data RE to be a constant value.

Preferably, the configuration unit is further used for configuring the transmission power of the DMRS at each layer in the same RE to the same.

Preferably, the apparatus may further include: a setting unit for setting different constant values for different total layer numbers used in downlink transmission; or for setting an unique constant value for different total layer numbers used in the downlink transmission.

Preferably, the setting unit is further used for setting a first constant value when a total layer number used in downlink transmission is less than or equal to 2; and setting a second constant value when the total layer number used in the downlink transmission is greater than or equal to 3.

Preferably, the apparatus may further include: a mapping unit for mapping the DMRS at one layer onto two DMRS ports when a total layer number used in downlink transmission is greater than or equal to 3 and is odd.

Preferably, the constant value is natural number less than or equal to 4.

In the present disclosure, the ratio between the transmission power of the DMRS at each layer in an RE and the transmission power of data at a corresponding layer is configured to be a constant value, and the constant ratio is configured in the user terminal. Therefore, the network side does not need to notify the user terminal of the corresponding relationship between the transmission power of the DMRS at each layer and the transmission power of data at the corresponding layer, which simplifies the overhead of the control signalling in the network side. As the corresponding relationship between the transmission power of the DMRS and the transmission power of data at each layer is configured in the user terminal, the user terminal can implement channel estimation without waiting for the notification from the network side, which improves the channel estimation efficiency.

DETAILED DESCRIPTION

The basic concept of the present disclosure is that: the ratio between the transmission power of the DMRS at each layer in a DMRS RE and the transmission power of data at a corresponding layer in a data RE is configured to be a constant value, and the constant ratio is set in the user terminal. Therefore, the network side does not need to notify the user terminal of the corresponding relationship between the transmission power of the DMRS at each layer and the transmission power of data at the corresponding layer, which simplifies the overhead of the control signalling in the network side.

For clarifying technical solutions and advantages of the present disclosure, the present disclosure is described below with reference to the accompanying drawings and embodiments in detail.

Figure 1:
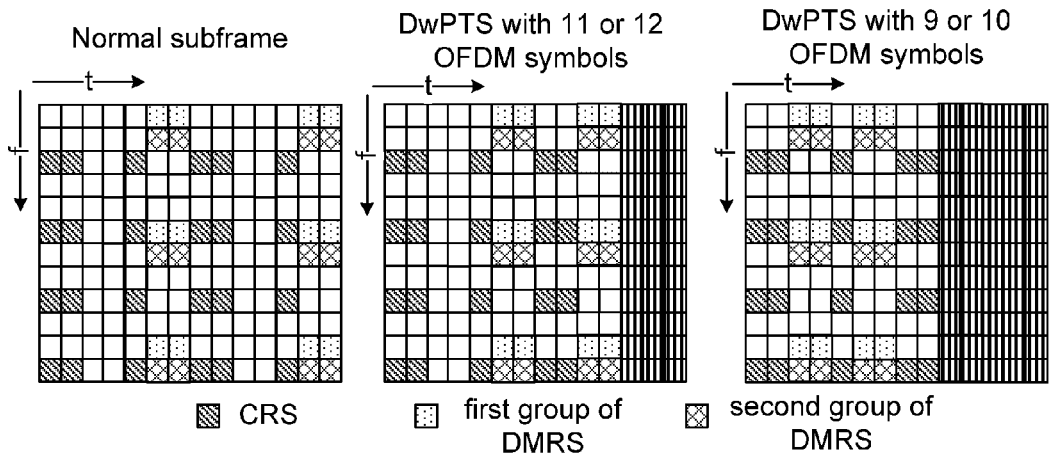
FIG. 1 shows a diagram of DMRS bearing in normal sub-frame and specific sub-frame with normal CP in the LTE_A system.

In the present disclosure, the DMRS resource element refers to a resource element for transmitting DMRS, and the data resource element refers to a resource element for performing the transmission of traffic data. As shown in FIG. 1, the grids covered with sand points and graticule lines in the diagram are the resource elements for bearing DMRS, and the bland grids are the resource elements for bearing data.

In the present disclosure, the total transmission power of the resource element corresponding to the demodulation reference signal is configured so that the ratio between the transmission power of the DMRS at each layer in the resource element and the transmission power of the data at the corresponding layer is configured to be a constant value. That is, the total transmission power in the DMRS resource element is determined according to the ratio between the transmission power of DMRS at each layer in the DMRS resource element and the transmission power of data at each layer in the data resource element.

At least one layer of DMRS can be borne in each DMRS resource element. Generally, the maximum layer number of the DMRS in the DMRS resource element for performing Code Division Multiplexing is 4 according to the current system characteristic. Data of all layers corresponding to the current total layer number is borne in the data resource element. In the present disclosure, the transmission power of the DMRS at each layer in each resource element is the same, and the transmission power of data at each layer in each resource element is also the same. In the present disclosure, the ratio between the transmission power of the DMRS at each layer in the resource element and the transmission power of data at the corresponding layer is configured to be a constant value. Therefore, the ratio relationship between the transmission power of data at each layer and the transmission power of the DMRS at each layer does not need to be notified to the user terminal, which greatly saves the overhead of the control signalling in the network side and further improves the channel estimation efficiency of the user terminal.

Two configuration modes are considered in the present disclosure:

Mode 1: the ratio between the transmission power of DMRS at each layer and the transmission power of data at the corresponding layer is a constant value r no matter how the current total layer number used in the downlink transmission is. When the total transmission power of the data RE is P, the total transmission power of the DMRS RE is $$\frac{l \cdot r}{L} P,$$

wherein L is the current total layer number used in the downlink transmission, and I is the layer number of the Code Division Multiplexing of DMRS in DMRS RE.

Mode 2: the ratio between the transmission power of the DMRS at each layer and the transmission power of the data at the corresponding layer is respectively set according to the current total layer number used in the downlink transmission. When the layer number is less than or equal to 2, the above ratio is a constant value r1; if the constant value is set to be 1, the total transmission power of the DMRS RE is just set to the same as the total transmission power of the data RE. When the layer number is greater than or equal to 3, the above ratio is a constant value r2, for example, r2 may be 2. When the total transmission power of the data RE is P, the total transmission power of the DMRS RE is $$\frac{l \cdot r1}{L} P \text{ or } \frac{l \cdot r2}{L} P,$$

wherein L is the current total layer number used in the downlink transmission, I is the layer number of DMRS Code Division Multiplexing in the DMRS RE.

The above constant value is generally a natural number less than 4.

The essence of the technical solution of present disclosure is further described below through the specific embodiments.

Embodiment 1

In the embodiment, it is assumed that each layer is appointed with a fixed DMRS antenna port. For example, when the current DMRS ports are {port0, port1, port2, port3, port4, port5, port6, port7} and the rank is 1 or 2, the pilot frequency sequence (DMRS) corresponding to the DMRS ports is mapped to DMRS ports through Code Division Multiplexing, wherein the corresponding relationship between the DMRS sequence at each layer and each DMRS port is: layer0⇔port0, and layer1⇔port1.

When the rank is 3 or 4, Code Division Multiplexing+Frequency Division Multiplexing/Time Division Multiplexing are performed to the pilot frequency sequence corresponding to DMRS ports, wherein Code Division Multiplexing is performed to the pilot frequency sequence corresponding to port0 and port1, shown as sand point grids in FIG. 1 for representing RE, and Code Division Multiplexing is performed to the pilot frequency sequence corresponding to port2 and port3, shown as graticule line grids in FIG. 1 for representing RE.

When the rank is 5 to 8, Code Division Multiplexing+Frequency Division Multiplexing/Time Division Multiplexing are performed to the pilot frequency sequence corresponding to DMRS ports, wherein Code Division Multiplexing is performed to the pilot frequency sequence corresponding to port0, port1, port4, port6, shown as sand point grids in FIG. 1 for representing RE, and Code Division Multiplexing is performed to the pilot frequency sequence corresponding to port2, port3, port5, port7, shown as graticule line grids in FIG. 1 for representing RE.

Based on a fixed DMRS antenna port corresponding to each layer, the ratio relationship between the total transmission power of DMRS RE and the total transmission power of each data RE is shown in Table 1:

TABLE 1

| Rank | Total DMRS RE power when r = 2 (3 dB offset) | Total DMRS RE power when r = 1 (0 dB offset) |
|---|---|---|
| 3 | $\frac{4}{3}$P: DMRS RE corresponding to first group of CDM ports<br><br>$\frac{2}{3}$P: DMRS RE corresponding to second group of CDM ports | $\frac{2}{3}$P: DMRS RE corresponding to first group of CDM ports<br><br>$\frac{1}{3}$P: DMRS RE corresponding to second group of CDM ports |
| 4, 6, 8 | P | $\frac{P}{2}$ |
| 5 | $\frac{6}{5}$P: DMRS RE corresponding to first group of CDM ports<br><br>$\frac{4}{5}$P: DMRS RE corresponding to second group of CDM ports | $\frac{3}{5}$P: DMRS RE corresponding to first group of CDM ports<br><br>$\frac{2}{5}$P: DMRS RE corresponding to second group of CDM ports |

TABLE 1-continued

| Rank | Total DMRS RE power when r = 2 (3 dB offset) | Total DMRS RE power when r = 1 (0 dB offset) |
|---|---|---|
| 7 | $\frac{8}{7}$P: DMRS RE corresponding to first group of CDM ports<br><br>$\frac{6}{7}$P: DMRS RE corresponding to second group of CDM ports | $\frac{4}{7}$P: DMRS RE corresponding to first group of CDM ports<br><br>$\frac{3}{7}$P: DMRS RE corresponding to second group of CDM ports |

In Table 1, r represents the ratio between transmission power of DMRS at each layer and transmission power of data at the corresponding layer after configuration, and P represents the total transmission power of the data RE; the RE corresponding to the layer of first group of CDM is particularly the RE represented by the sand point grids shown in FIG. 1, and the RE corresponding to the layer of second group of CDM is particularly the RE represented by the graticule line grids shown in FIG. 1. Taking the condition that Rank is 5 and r is 2 in Table 1 as an example, the total transmission power of the RE corresponding to the layer of first group of CDM is ⅖P. Since three layers (layer0, layer1, layer4) of DMRS are borne in the RE and the transmission power of the DMRS at each layer in the RE is the same, the transmission power of the DMRS at each layer is ⅖P. Since five layers of data are borne in the data RE and the total transmission power of the data RE is P, therefore the transmission power of data at each layer is ⅕P. Consequently, the transmission power of the DMRS at each layer in the DMRS RE is ensured to be twice of the transmission power corresponding to data at the layer.

For the total transmission power of the RE corresponding to the layer of second group of CDM as ⅘P, since two layers (layer2, layer3) of DMRS are borne in the RE, the transmission power of the DMRS at each layer in the RE is the same as well; therefore, the transmission power of the DMRS at each layer is ⅖P. Five layers of data are borne in the data RE and the total transmission power of the data RE is P, therefore the transmission power of the data at each layer is ⅕P. Consequently, the transmission power of the DMRS at each layer in the DMRS RE is ensured to be twice of the transmission power corresponding to the data at the layer.

It is explained that Table 1 assumes that the layer number mapped to the RE of the first group of DMRS is greater than or equal to the layer number mapped to the RE of the second group of DMRS. When the layer number mapped to the RE of the first group of DMRS is less than or equal to the layer number mapped to the RE of the second group of DMRS, the total power of the RE corresponding to the first group of CDM ports and the total power of the RE corresponding to the second group of CDM ports in Table 1 can be exchanged.

Embodiment 2

In the embodiment, when odd layers exist, DMRS of a certain layer is mapped to two DMRS ports simultaneously so that the number of the DMRS ports is even. For example, it is assumed that I layers exist as layer0, layer1, . . . , layerI. When I is an odd number, the DMRS corresponding to a certain layer i is mapped on two DMRS ports simultaneously. For example, it is assumed that the layer number is 3, the DMRS corresponding to layer 0 can be mapped on two DMRS ports simultaneously, such as, layer 0 and layer 1 correspond to one group of DMRS ports, and layer 0 are layer 2 correspond to the other group of DMRS ports.

The relationship between the total transmission power of the DMRS RE and the total transmission power of each data RE is shown in Table 2.

Based on the mapping relationship between the above layers and the DMRS antenna ports, the relationship between the total transmission power of the DMRS RE and the total transmission power of each data RE is shown in Table 2:

TABLE 2

| Rank | Total DMRS RE power when r = 2 (3 dB offset) | Total DMRS RE power when r = 1 (0 dB offset) |
|---|---|---|
| 3 | $\frac{4}{3}P$ | $\frac{2}{3}P$ |
| 4, 6, 8 | P | $\frac{P}{2}$ |
| 5 | $\frac{6}{5}P$ | $\frac{3}{5}P$ |
| 7 | $\frac{8}{7}P$ | $\frac{4}{7}P$ |

In Table 2, r represents the ratio between the transmission power of the DMRS at each layer and the transmission power of data at the corresponding layer after configuration, and P represents the total transmission power of the data RE. In the embodiment, for each value of rank, the total transmission power of the RE represented by sand point grids and represented by graticule line grids in FIG. 1 are configured to be the same.

Taking the condition that Rank is 5 and r is 2 in Table 1 as an example, the total transmission power of the DMRS RE is ⅚P. Since a certain layer of DMRS is mapped to two DMRS ports simultaneously, three layers of DMRS are borne in the REs represented by sand point grids and represented by graticule line grids in FIG. 1. Since the transmission power of the DMRS at each layer in the RE is the same, therefore the transmission power of the DMRS at each layer in DMRS RE is ⅖P. Since five layers of data are borne in the data RE and the total transmission power of the data RE is P, therefore the transmission power of the data at each layer is ⅕P. Consequently, the transmission power of the DMRS at each layer in the DMRS RE is ensured to be twice of the transmission power corresponding to data at the layer.

Figure 2:
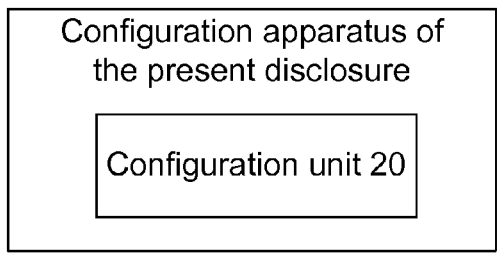
FIG. 2 shows the first structure of the transmission power configuration apparatus for demodulation reference signal in the present disclosure.

FIG. 2 shows the first structure of the transmission power configuration apparatus for demodulation reference signal in the present disclosure. As shown in FIG. 2, the transmission power configuration apparatus for demodulation reference signal in the example comprises a configuration unit 20, which is used for configuring the ratio between the transmission power of the DMRS at each layer in DMRS RE and the transmission power of data at the corresponding layer in data RE to be a constant value. In particular, the configuration unit 20 is used for configuring the transmission power of the DMRS at each layer in the same RE to be the same.

Figure 3:
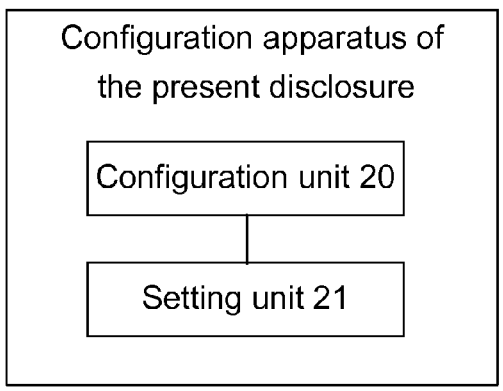
FIG. 3 shows the second structure of the transmission power configuration apparatus for demodulation reference signal in the present disclosure.

FIG. 3 shows the second structure of the transmission power configuration apparatus for demodulation reference signal in the present disclosure. As shown in FIG. 3, on the basis of the apparatus shown in FIG. 2, the transmission power configuration apparatus for demodulation reference signal in the example further comprises: a setting unit 21, which is for setting different constant values for different total layer numbers used in the downlink transmission, or setting an unique constant value for different total layer numbers used in the downlink transmission. The setting unit 21 is further used for setting a first constant value when the total layer number used in the downlink transmission is less than or equal to 2, and setting a second constant value when the total layer number used in the downlink transmission is greater than or equal to 3.

Figure 4:
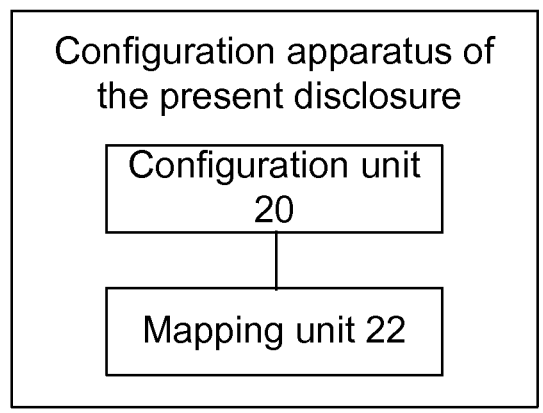
FIG. 4 shows the third structure of the transmission power configuration apparatus for demodulation reference signal in the present disclosure.

FIG. 4 shows the third structure of the transmission power configuration apparatus for demodulation reference signal in the present disclosure. As shown in FIG. 4, on the basis of the apparatus shown in FIG. 2 or FIG. 3 (the example is based on FIG. 2), the transmission power configuration apparatus for demodulation reference signal in the example further comprises: a mapping unit 22, which is for mapping the DMRS at one layer onto two DMRS ports when a total layer number used in downlink transmission is greater than or equal to 3 and is odd.

The above constant values are natural numbers less than or equal to 4.

Persons skilled in the art should understand that the transmission power configuration apparatus for demodulation reference signal shown in FIG. 2, FIG. 3 and FIG. 4 is designed for implementing the above transmission power configuration method for demodulation reference signal, wherein the function of each unit in the apparatus is shown in FIG. 2, FIG. 3 and FIG. 4 can be understood as a reference to the description of the above method, and the function of each unit can be implemented through a program on a processor and also can be implemented through a specific logic circuit.

The above is only the preferred embodiments of the present disclosure and not intended to limit the protection scope of the present disclosure.

What is claimed is:

1. A method for configuring a transmission power of Demodulation Reference Signal (DMRS) in down transmission, comprising:
    configuring by the network side a ratio between transmission power of a DMRS at each layer in a DMRS Resource Element (RE) and transmission power of data at a corresponding layer in a data RE to be a constant value;
    the method further comprises:
    setting by the network side different constant values for different total layer numbers used in downlink transmission; or
    setting an unique constant value for different total layer numbers used in the downlink transmission;
    wherein the step of setting the different constant values for different total layer numbers used in the downlink transmission further comprises:
    setting by the network side a first constant value when the total layer number used in the downlink transmission is less than or equal to 2; and
    setting a second constant value when the total layer number used in the downlink transmission is greater than or equal to 3.

2. The method according to claim 1, further comprising:
    configuring by the network side the transmission power of the DMRS at each layer in the same RE to the same.

3. The method according to claim 1, further comprising:
    mapping by the network side the DMRS at one layer onto two DMRS ports when a total layer number used in downlink transmission is greater than or equal to 3 and is odd.

4. An apparatus for configuring a transmission power of Demodulation Reference Signal (DMRS) in down transmission, comprising:
    a configuration unit including a logic circuit for configuring a ratio between transmission power of a DMRS at each layer in a DMRS Resource Element (RE) and transmission power of data at a corresponding layer in a data RE to be a constant value;

the apparatus further comprises:

a setting unit including a logic circuit for setting different constant values for different total layer numbers used in downlink transmission; or setting an unique constant value for different total layer numbers used in the downlink transmission;

wherein the setting unit including a logic circuit is further used for setting a first constant value when a total layer number used in downlink transmission is less than or equal to 2; and setting a second constant value when the total layer number used in the downlink transmission is greater than or equal to 3.

5. The apparatus according to claim 4, wherein the configuration unit including a logic circuit is further used for configuring the transmission power of the DMRS at each layer in the same RE to the same.

6. The apparatus according to claim 4, further comprising:

a mapping unit including a logic circuit for mapping the DMRS at one layer onto two DMRS ports when a total layer number used in downlink transmission is greater than or equal to 3 and is odd.

* * * * *